(12) United States Patent
Sugeno

(10) Patent No.: US 8,203,624 B2
(45) Date of Patent: Jun. 19, 2012

(54) IMAGE-DATA PROCESSING APPARATUS AND IMAGE PICKUP APPARATUS

(75) Inventor: Kazuhiro Sugeno, Kanagawa (JP)

(73) Assignee: Sony Corporation, Tokyo (JP)

( * ) Notice: Subject to any disclaimer, the term of this patent is extended or adjusted under 35 U.S.C. 154(b) by 153 days.

(21) Appl. No.: 12/756,249

(22) Filed: Apr. 8, 2010

(65) Prior Publication Data

US 2010/0259654 A1    Oct. 14, 2010

(30) Foreign Application Priority Data

Apr. 14, 2009    (JP) ................................ P2009-098234

(51) Int. Cl.
  *H04N 9/73*    (2006.01)
  *H04N 5/217*   (2011.01)
  *G06K 9/40*    (2006.01)
(52) U.S. Cl. ...................... 348/228.1; 348/241; 382/274
(58) Field of Classification Search .... 348/226.1–228.1, 348/241; 382/274, 275
See application file for complete search history.

(56) References Cited

U.S. PATENT DOCUMENTS

| | | | |
|---|---|---|---|
| 6,710,818 B1 | 3/2004 | Kasahara et al. | |
| 7,656,436 B2 * | 2/2010 | Kinoshita et al. | 348/226.1 |
| 2008/0075382 A1 * | 3/2008 | Sugeno et al. | 382/270 |
| 2009/0066805 A1 * | 3/2009 | Fujiwara et al. | 348/223.1 |

FOREIGN PATENT DOCUMENTS

JP    2001 111887    4/2001

* cited by examiner

*Primary Examiner* — Daniel M Pasiewicz
(74) *Attorney, Agent, or Firm* — Frommer Lawrence & Haug LLP; William S. Frommer

(57) ABSTRACT

An image-data processing apparatus includes an operation unit; a correcting unit multiplying image data generated by an image pickup device by a correction gain; a totalizing unit sequentially calculating a total pixel level for every frame from the image data; a history holding unit holding the total pixel levels of a certain number; an in-phase averaging unit detecting the total pixel levels in phase with a flicker phase corresponding to the image data that is being supplied to the correcting unit from the held total pixel levels to calculate a first average of the detected total pixel levels; an average calculating unit calculating a second average of the held total pixel levels; and a correction gain calculating unit calculating the correction gain by dividing the first average by the second average to set the correction gain in the correcting unit.

6 Claims, 7 Drawing Sheets

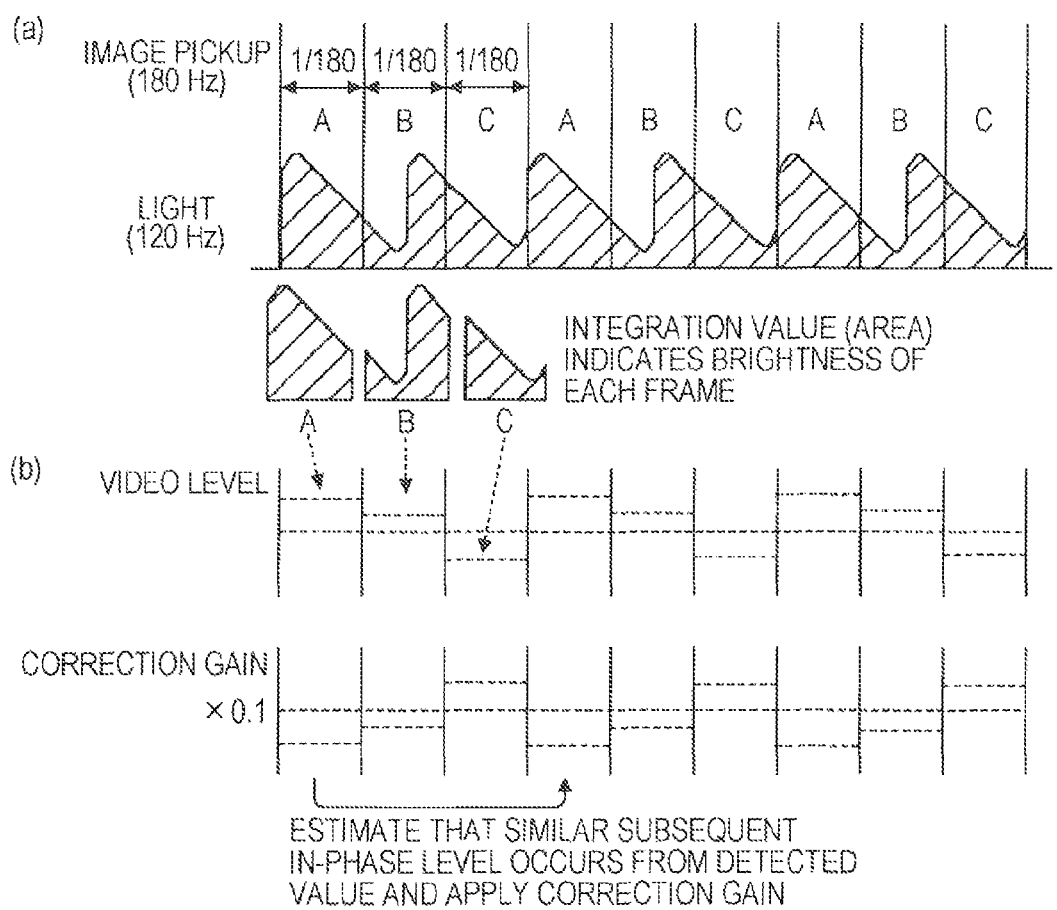

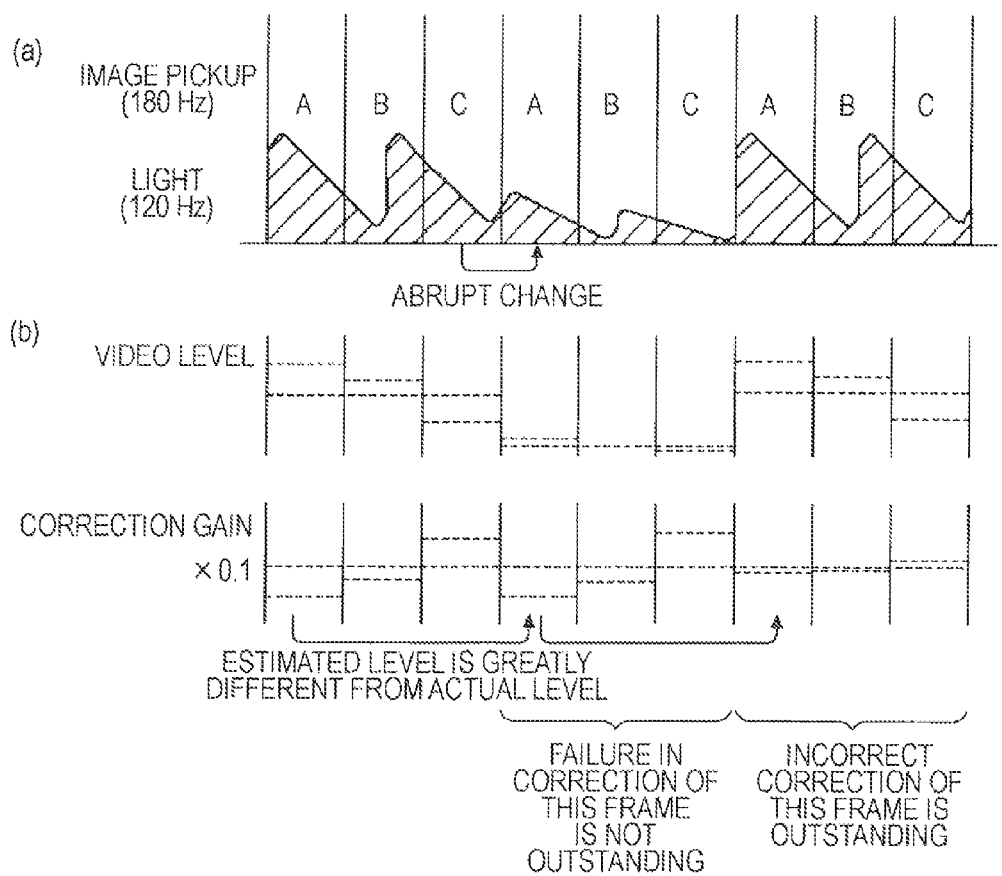

IMAGE-DATA PROCESSING APPARATUS AND IMAGE PICKUP APPARATUS

BACKGROUND OF THE INVENTION

1. Field of the Invention

The present invention relates to a technology to detect flicker and correct the detected flicker. More particularly, the present invention relates to an image-data processing apparatus and an image pickup apparatus that detect flicker occurring in a video image captured with illuminating light the brightness of which varies with the power frequency to correct the detected flicker.

2. Description of the Related Art

Although the problem of flicker is frequently approached in image pickup devices having a rolling shutter function, blinking over the entire screen occurs in image pickup devices having a global shutter function. Such blinking is called plane flicker. The plane flicker is caused in a case in which the blinking cycle (for example, the blinking cycle of the illuminating light is equal to $\frac{1}{120}$ seconds in West Japan and is equal to $\frac{1}{100}$ seconds in East Japan) of the illuminating light is not an integral multiple of the imaging cycle. The blinking cycle of the illuminating light is determined by the power frequency. For example, in Japan, since the power frequency in West Japan is set to 60 Hz, the blinking cycle of the illuminating light in West Japan is equal to $\frac{1}{120}$ seconds. In contrast, since the power frequency in East Japan is set to 50 Hz, the blinking cycle of the illuminating light in East Japan is equal to $\frac{1}{100}$ seconds.

It is a common knowledge that the plane flicker occurs at a frequency that is equal to the least common multiple of the imaging frequency of an image pickup apparatus and the blinking frequency of the illuminating light. In order to remove the plane flicker having the above characteristics, the correction gain to be applied to digital signals (image data) captured by the image pickup devices having the global shutter function is varied in related art.

A method of determining the correction gain in the related art will now be described with reference to FIGS. 8(a) and 8(b).

FIGS. 8(a) and 8(b) illustrate a technology in the related art to correct the plane flicker when a small change occurs in a target of the image capturing.

FIG. 8(a) illustrates a waveform indicating the relationship between the imaging frequency and the blinking frequency of the illuminating light.

Referring to FIG. 8(a), the vertical axis represents the strength of the illuminating light and the horizontal axis represents time.

FIG. 8(b) illustrates a waveform indicating the relationship between a digital signal generated by photoelectric conversion in an image pickup device and the correction gain based on the digital signal.

Referring to FIG. 8(b), the vertical axis in the upper waveform represents the level of the digital signal, that is, the brightness of each frame. The vertical axis in the lower waveform represents the magnitude of the correction gain. The horizontal axis representing time is common to the upper and lower waveforms.

For example, when the imaging cycle, that is, the exposure time is equal to $\frac{1}{180}$ seconds in an image pickup apparatus, the imaging frequency of the image pickup apparatus is equal to 180 Hz. In the image capturing with the illuminating light having a blinking frequency of 120 Hz by the image pickup apparatus, the cycle of the plane flicker appearing in moving images captured by the image pickup apparatus is equal to 60 Hz, which is the greatest common measure of the imaging frequency and the blinking frequency. In this case, the sum (hereinafter referred to as a "total pixel level") of the pixel levels in each frame of the digital signal output from the image pickup device is varied at a frequency of 60 Hz, as shown in the upper waveform in FIG. 8(b).

In the related art, the correction gain is determined by using data items in phase with each other immediately before the frame to be corrected according to a fact that the least common multiple of the imaging frequency and the blinking frequency of the illuminating light is equal to the flicker frequency. As shown in the lower waveform in FIG. 8(b), the effective correction can be achieved by this method when a small change occurs in the target of the image capturing. For example, a technology to determine correction gains against the flicker of this type is disclosed in Japanese Unexamined Patent Application Publication No. 2001-111887.

SUMMARY OF THE INVENTION

However, if the luminance and/or color of the target of the image capturing is instantaneously changed, the instantaneous change (disturbance) is also used as the correction data in the subsequent cycle, as shown in FIGS. 9(a) and 9(b). Accordingly, there is a problem in that inappropriate correction can be applied to the frames at normal levels to greatly degrade the image quality.

It is desirable to provide an image-data processing apparatus and an image pickup apparatus capable of suppressing a reduction in the quality of moving images due to incorrect determination of flicker.

According to an embodiment of the present invention, an image-data processing apparatus includes an operation unit; a correcting unit configured to multiply image data generated by an image pickup device that performs image capturing at a certain imaging frequency by a correction gain that is set; a totalizing unit configured to sequentially calculate a total pixel level for every frame from the image data generated by the image pickup device, the total pixel level corresponding to the sum of the pixel levels of the pixels within a certain range in each frame; a history holding unit configured to hold the total pixel levels of a certain number each time the total pixel levels are calculated; an in-phase averaging unit configured to detect the total pixel levels in phase with a flicker phase corresponding to the image data that is being supplied to the correcting unit from the total pixel levels held in the history holding unit on the basis of the imaging frequency and a power frequency supplied from the operation unit to calculate a first average, which is the average of the detected total pixel levels; an average calculating unit configured to calculate a second average, which is the average of the total pixel levels held in the history holding unit; and a correction gain calculating unit configured to calculate the correction gain by dividing the first average calculated in the in-phase averaging unit by the second average calculated in the average calculating unit to set the calculated correction gain in the correcting unit.

The multiple total pixel levels are added in the in-phase averager and the average calculator in the above configuration. Accordingly, the first average and the second average can be calculated from the total pixel levels during a period of a length allowing an instantaneous change in the imaging situation to be ignored and the appropriate correction gain can be calculated from the first and second averages. The image data to be corrected can be corrected by using the calculated correction gain.

According to the present invention, it is possible to provide an image-data processing apparatus and an image pickup apparatus capable of suppressing a reduction in the quality of moving images due to incorrect determination of flicker caused by an instantaneous change in the imaging situation.

BRIEF DESCRIPTION OF THE DRAWINGS

FIGS. 8(a) and 8(b) illustrate a technology in the related art to correct plane flicker when a small change occurs in the target of the image capturing; and FIGS. 9(a) and 9(b) illustrate a technology in the related art to correct the plane flicker when an instantaneous change occurs in the target of the image capturing.

DESCRIPTION OF THE PREFERRED EMBODIMENTS

Figure 1:
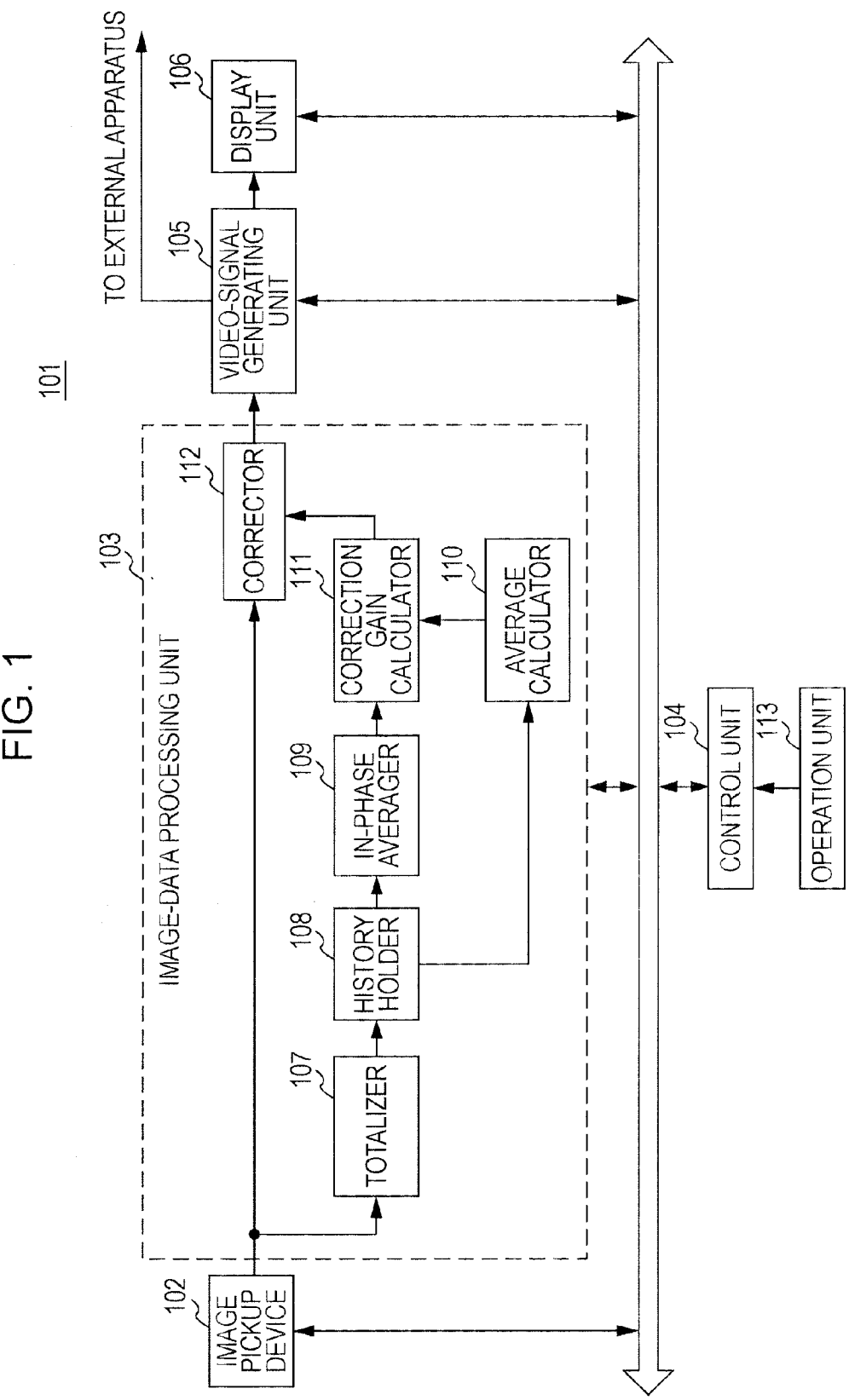
FIG. 1 is a functional block diagram showing an image pickup apparatus according to an embodiment of the present invention.

Embodiments of the present invention will herein be described in detail with reference to the attached drawings. Since the embodiments described below are preferred specific examples of the present invention, various preferred technical restrictions are imposed on the embodiments. However, the scope of the present invention is not limited to the embodiments unless specified in the following description. For example, numerical conditions of parameters described in the following description are only preferred examples and schematic dimensions, shapes, and arrangements are shown in the drawings used in the description.

1. An Embodiment

[Configuration of Image Pickup Apparatus 101]

FIG. 1 is a functional block diagram showing an image pickup apparatus according to an embodiment of the present invention.

An image pickup apparatus 101 shown in FIG. 1 includes a lens (not shown) and an image is formed on an imaging plane (not shown) of an image pickup device 102 with imaging light through the lens. The image pickup device 102 is an image pickup device having the global shutter function, for example, a charge coupled device (CCD) image pickup device. The image pickup device 102 performs the photoelectric conversion on the imaging light on the imaging plane, used in the formation of the image through the lens, to generate a certain analog signal and performs digital conversion on the analog signal to generate a certain digital signal (image data). The digital signal is a color signal of red(R), green(G), or blue(B).

The digital signal generated in the image pickup device 102 is supplied to an image-data processing unit 103. The image pickup device 102 has an electronic shutter function and sets an imaging frequency for the electronic shutter on the basis of an instruction from a control unit 104 described below. It is assumed in the present embodiment that the frame rate of a video image captured by the image pickup device 102 is equal to 180 frames/second, that is, the imaging frequency is equal to 180 Hz.

The image-data processing unit 103 controls the gain of the digital signal supplied from the image pickup device 102 in units of frames. The image-data processing unit 103 removes a flicker component of the plane flicker included in the digital signal by the gain control to generate a digital signal of a certain level. The removal of a flicker component of the plane flicker is hereinafter referred to as a "flicker correction process". The digital signal subjected to the flicker correction process, generated in the image-data processing unit 103, is supplied to a video-signal generating unit 105. The gain control of the digital signal in the image-data processing unit 103 is separately performed for the color signal (red), the color signal (green), and the color signal (blue). However, since the same process is basically performed by the image-data processing unit 103 for the color signal (red), the color signal (green), and the color signal (blue), a description of the processes for the respective signals of these three colors is omitted herein. The image-data processing unit 103 will be described in detail below.

The video-signal generating unit 105 performs, for example, a process of correcting a reduction in the peripheral light intensity on each frame of the digital signal supplied from the image-data processing unit 103, a certain interpolation process, and signal processing, such as a filter process and a shading process, involved in the correction process and the interpolation process. In addition, the video-signal generating unit 105 also performs processing for an improvement in the image quality.

Furthermore, the video-signal generating unit 105 performs common image processing, such as a color tone adjustment process, a luminance compression process, and gamma correction, on the digital signal supplied from the image-data processing unit 103 to generate a video signal to be supplied to a certain display apparatus. The video signal subjected to the image processing is displayed as a video image in a display unit 106 composed of, for example, a liquid crystal display or is supplied to an external apparatus, such as a personal computer. The flicker correction process in the image-data processing unit 103 and the other correction processes in the video-signal generating unit 105 are performed under the control of the control unit 104 described below.

The control unit 104 is, for example, a microcomputer and controls each block composing the image pickup apparatus 101. Specifically, the control unit 104 controls, for example, setting of the imaging frequency concerning the electronic shutter of the image pickup device 102 and setting of the gains concerning the image-data processing unit 103. In addition, the control unit 104 controls the operations of the blocks including an optical system including the lens (not shown) and the image pickup device 102. The control unit 104 is connected to each block in the image pickup apparatus 101 so as to be capable of data transmission for the control operations.

An operation unit 113 includes button keys provided in the image pickup apparatus 101 and soft keys allocated to icons displayed on the screen of the display unit 106 in the image pickup apparatus 101. An operation signal in accordance with a user's operation is supplied from the operation unit 113 to the control unit 104 through a certain interface (not shown). The control unit 104 performs certain calculations and control of each circuit on the basis of the operation signal or predetermined settings in accordance with a computer program stored in a non-volatile storage unit, such as a read only memory (ROM), in the control unit 104.

The characteristics of the plane flicker to be processed in the image-data processing unit 103 composing the image pickup apparatus 101 will now be described with reference to FIG. 2.

Figure 2:
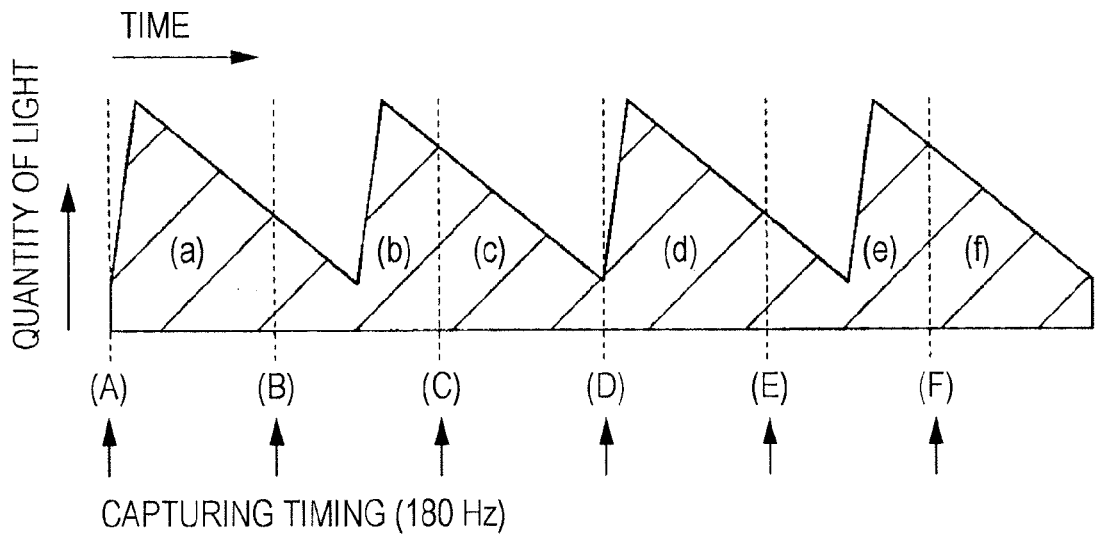
FIG. 2 is a waveform diagram indicating a variation with time of imaging light incident on an image pickup device when a change does not occur in a target of the image capturing.

FIG. 2 is a waveform diagram indicating a variation with time of imaging light incident on the image pickup device 102 when a change does not occur in a target of the image capturing.

Referring to FIG. 2, the vertical axis represents the quantity of the imaging light incident on the image pickup device 102 and the horizontal axis represents time.

It is assumed in the example in FIG. 2 that the image capturing is performed at a power frequency of 60 Hz, that is, with the illuminating light having a blinking cycle of 1/120 seconds by using the image pickup apparatus 101 in which the image pickup device 102 has an imaging frequency of 180 Hz, that is, a frame rate of 180 frames/second.

Under the above conditions, data having the same flicker phase is supplied from the image pickup device 102 to the image-data processing unit 103 for every three frames, as shown in FIG. 2. Accordingly, the image-data processing unit 103 can know when the same flicker phase appears if the power frequency and the imaging frequency have been indicated to the image-data processing unit 103 in advance.

Referring back to FIG. 1, the image-data processing unit 103 will now be described in detail.

The image-data processing unit 103 includes a totalizer 107, a history holder 108, an in-phase averager 109, an average calculator 110, a correction gain calculator 111, and a corrector 112.

The totalizer 107 sequentially calculates the total pixel level in each frame from the digital signal generated by the image pickup device 102. As described above, the total pixel level indicates the sum of the pixel levels of the pixels corresponding to the respective frames. Each time the total pixel level is calculated, the totalizer 107 supplies the calculated total pixel level to the history holder 108.

The history holder 108 is, for example, a frame memory and holds the latest total pixel levels of a certain number among the total pixel levels supplied from the totalizer 107. Each time the data held in the history holder 108 is updated, all the total pixel levels held in the history holder 108 are supplied to the in-phase averager 109 and the average calculator 110. According to the present embodiment, the number of the total pixel levels held in the history holder 108 is set to 180. However, the number of the total pixel levels held in the history holder 108 and the number of the total pixel levels output from the history holder 108 are not limited to 180. Data transmission is performed between the history holder 108 and the control unit 104, and the number of the total pixel levels held in the history holder 108 and the number of the total pixel levels output from the history holder 108 are set in accordance with a user's operation with the operation unit 113.

The in-phase averager 109 detects all the total pixel levels in phase with the flicker phase corresponding to the digital signal that is being supplied to the corrector 112 from the all the total pixel levels supplied from the history holder 108. The detection is realized by using the imaging frequency and the blinking frequency of the illuminating light, as described above with reference to FIG. 2. Accordingly, the in-phase averager 109 is electrically connected to the control unit 104, and the imaging frequency and the power frequency input by the user with the operation unit 113 are supplied to the in-phase averager 109 through the control unit 104.

The in-phase averager 109 calculates an average Da of all the detected total pixel levels to supply the calculated average Da of the total pixel levels to the correction gain calculator 111.

According to the present embodiment, as shown in FIG. 2, the flicker phase includes three patterns and the same flicker phase appears for every three cycles. Accordingly, the in-phase averager 109 uses the average of the 60 total pixel levels as the average Da.

The average calculator 110 calculates an average Dx of all the total pixel levels supplied from the history holder 108 to supply the calculated average Dx of all the total pixel levels to the correction gain calculator 111. Since the number of the total pixel levels supplied from the history holder 108 to the average calculator 110 is 180 in the present embodiment, the average calculator 110 calculates the average of the 180 total pixel levels. The 180 total pixel levels are used as data corresponding to the digital signal for one second. The average Dx calculated from the 180 total pixel levels includes a sufficient number of data items in all the levels that will be varied due to the flicker having a flicker frequency of 180 Hz. In other words, it may be considered that the average Dx is equivalent to the digital signal including no flicker. Accordingly, the average Dx is used as a reference value in calculation of the correction gain in the next stage.

The correction gain calculator 111 uses the output from the in-phase averager 109 and the output from the average calculator 110 to calculate a correction gain Gn and supplies the calculated correction gain Gn to the corrector 112.

The correction gain Gn is calculated according to Equation (1):

$$Gn = Da/Dx \quad (1)$$

The corrector 112 is a multiplier that multiplies the digital signal supplied from the image pickup device 102 by the correction gain Gn supplied from the correction gain calculator 111. As a result, the gain control is performed on the digital signal supplied from the image pickup device 102 for every frame and the digital signal subjected to the gain control is supplied to the video-signal generating unit 105.

[Operation of Image Pickup Apparatus 101]

An example of the operation of the image pickup apparatus 101 will now be described with reference to FIG. 3 and FIGS. 4(a) and 4(b).

Figure 3:
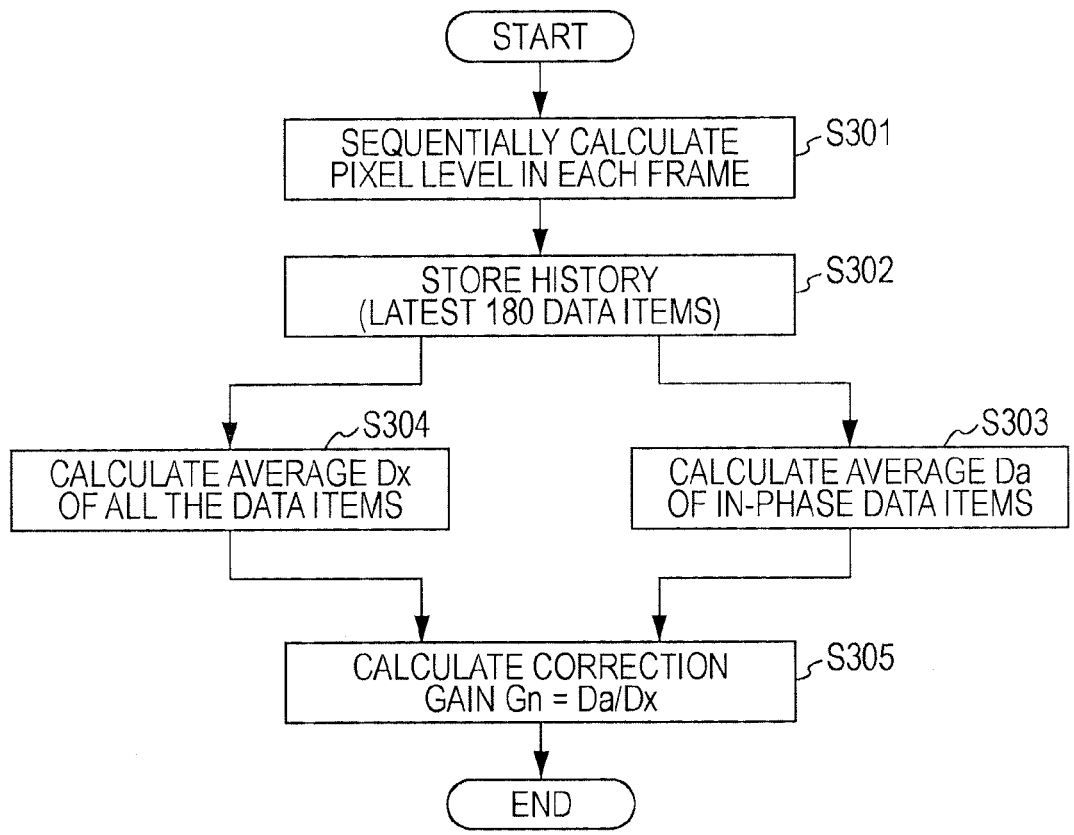
FIG. 3 is a flowchart showing an example of a flicker correction process by an image-data processing unit.

FIG. 3 is a flowchart showing an example of the flicker correction process by the image-data processing unit 103.

Referring to FIG. 3, the digital signal is supplied from the image pickup device 102 to the image-data processing unit 103. In Step S301, the totalizer 107 in the image-data processing unit 103 sequentially calculates the total pixel level in each frame from the received digital signal. Each time the total pixel level is calculated, the totalizer 107 supplies the calculated total pixel level to the history holder 108.

In Step S302, the history holder 108 holds the latest 180 total pixel levels among the total pixel levels supplied from the totalizer. 107. Each time the 180 total pixel levels held in the history holder 108 are updated, the 180 total pixel levels held in the history holder 108 are supplied to the in-phase averager 109 and the average calculator 110.

The in-phase averager 109 detects the 60 total pixel levels in phase with the flicker phase corresponding to the digital signal that is being supplied to the corrector 112 from the latest 180 total pixel levels supplied from the history holder 108. The detection is based on the imaging frequency (180 Hz) and the power frequency (60 Hz) supplied from the control unit 104, as described above. In Step 303, the in-phase averager 109 calculates the average Da of all the detected 60 total pixel levels in phase with each other. The in-phase averager 109 supplies the calculated average Da to the correction gain calculator 111.

The same total pixel levels as those supplied from the history holder 108 to the in-phase averager 109 are supplied to the average calculator 110. In Step S304, the average calculator 110 calculates the average Dx of the supplied latest 180 total pixel levels. The average calculator 110 supplies the calculated average Dx to the correction gain calculator 111.

After the above steps are completed, in Step S305, the correction gain calculator 111 applies Equation (1) to the average Da supplied from the in-phase averager 109 and the average Dx supplied from the average calculator 110 to calculate the correction gain Gn. The correction gain calculator 111 supplies the calculated correction gain Gn to the corrector 112. The corrector 112 multiplies the digital signal supplied from the image pickup device 102 by the correction gain Gn supplied from the correction gain calculator 111 for every frame to remove the component of the plane flicker included in the digital signal.

The temporal relationship between the digital signal supplied to the corrector 112 and the correction gain Gn used in the correction of the digital signal will now be described with reference to FIGS. 4(a) and 4(b).

Figure 4:
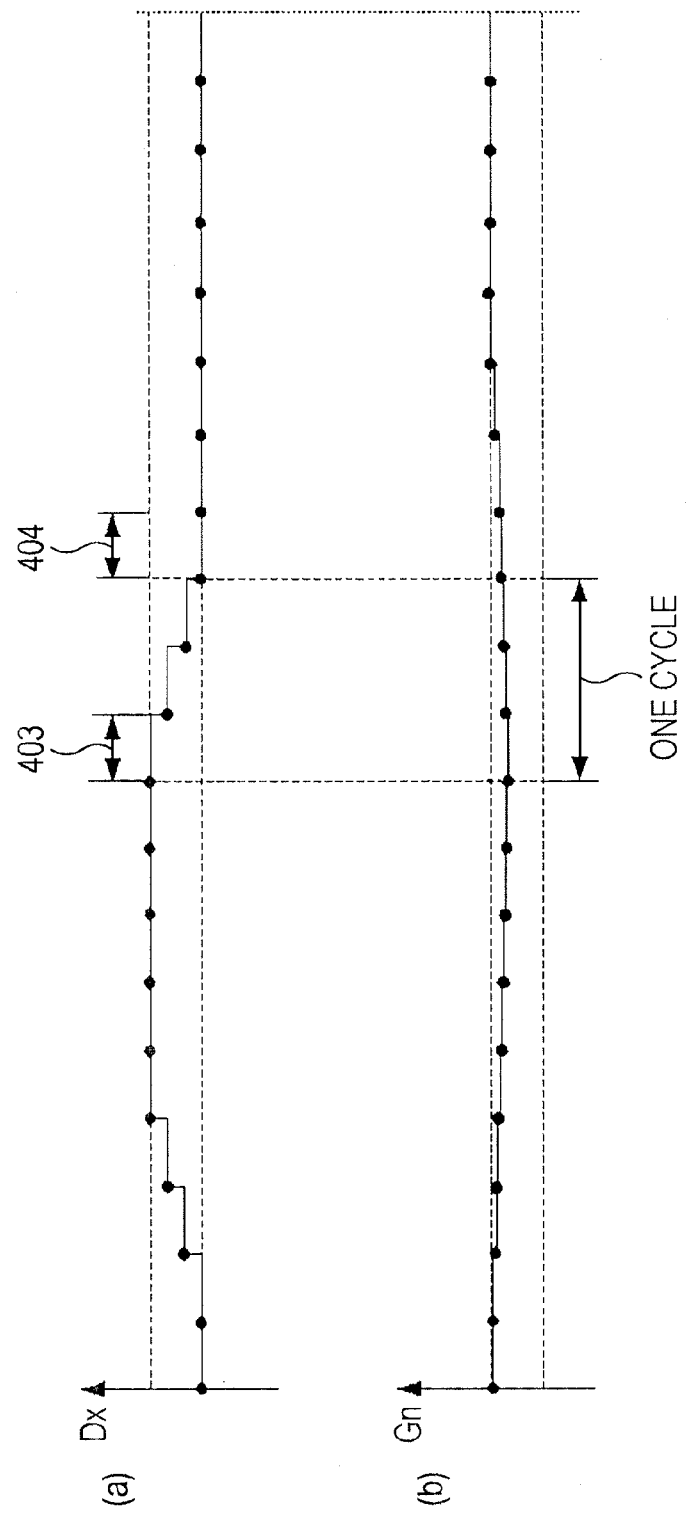
FIGS. 4(a) and 4(b) are waveform diagrams showing an example of how an average Dx is varied and an example of how a correction gain Gn is varied, respectively, when an instantaneous change occurs in the imaging situation.

FIGS. 4(a) and 4(b) are waveform diagrams showing examples of how the average Dx and the correction gain Gn are varied when an instantaneous change occurs in the imaging situation.

FIG. 4(a) is a waveform diagram showing an example of how the average Dx is varied with time.

Referring to FIG. 4(a), the vertical axis represents the magnitude of the average Dx and the horizontal axis represents time.

The average Dx is substantially equivalent to data in a state having no flicker when the image capturing is stably performed, as described above, and has a substantially constant value. However, if an instantaneous change occurs in the imaging situation, the average Dx instantaneously increases or decreases depending on the change because the average Dx is calculated from the 180 total pixel levels, that is, from the total pixel levels corresponding to one second. The change here means, for example, a change in the light reflected from the target of the image capturing an image of which is captured by the image pickup device 102 or a change in color of the target of the image capturing.

Since the average Dx instantaneously increases in the example shown in FIG. 4(a), an instantaneous change occurs in the imaging situation during the period in which the average Dx increases.

FIG. 4(b) is a waveform diagram showing an example of how the correction gain Gn is varied with time.

Referring to FIG. 4(b), the vertical axis represents the magnitude of the correction gain Gn and the horizontal axis represents time.

The correction gain Gn shown in FIG. 4(b) is calculated by the correction gain calculator 111 on the basis of the average Dx shown in FIG. 4(a) and the average Da calculated by the in-phase averager 109 during the same period as the one in which the average Dx is calculated.

The correction gain Gn is used to correct the digital signal that is supplied to the corrector 112 one cycle after the digital signal used in the calculation of the correction gain Gn is supplied to the corrector 112. The one cycle corresponds to the period in which all the patterns (three patterns in this example) of the flicker phase appear and is equal to a reciprocal of 60 Hz, which is the least common multiple of the blinking frequency (120 Hz) of the illuminating light and the imaging frequency (180 Hz), that is, is equal to 1/60 seconds. The one cycle includes the three averages Dx and correction gains Gn corresponding to the respective flicker phases of the three patterns.

In this example, the correction gains calculated in a period 403 is used to correct the digital signal supplied to the corrector 112 during a period 404 one cycle after the period 403, that is, 1/60 seconds after the period 403.

Each correction gain Gn calculated during the period 403 in which the average Dx changes instantaneously is calculated on the basis of the digital signal output from the image pickup device 102 when a instantaneous change occurs in the imaging situation. In contrast, the digital signal supplied from the image pickup device 102 to the corrector 112 during the period 404 in which each correction gain is used in the correction is in the stable imaging situation. However, the correction gain Gn calculated during the period 403 has a value close to that of the correction gain Gn calculated during the period 404. Accordingly, the correction of the digital signal supplied to the corrector 112 during the period 404 by using the correction gain Gn calculated during the period 403 is substantially equivalent to the correction of the digital signal supplied to the corrector 112 during the period 404 by using the optimal correction gain Gn calculated during the period 404. When no instantaneous change occurs in the imaging situation, the correction gains that are calculated have a substantially constant value, so that the digital signal supplied from the image pickup device 102 to the corrector 112 is subjected to appropriate correction.

As described above, the multiple total pixel levels are added in the in-phase averager 109 and the average calculator 110 in the present embodiment. Specifically, the average Da and the average Dx are calculated from the total pixel levels during the period having a length allowing the temporary change in the imaging situation to be ignored, and the correction gain Gn is calculated from the average Da and the average Dx. Accordingly, since any instantaneous change that occurs in the imaging situation can be prevented from affecting the correction gain Gn that is calculated, it is possible to apply the appropriate correction gain Gn to the digital signal to be corrected in order to perform the correction. Consequently, the present embodiment has an effect in that a reduction in the quality of the moving image due to incorrect determination of the flicker can be suppressed.

In addition, the time (the number of the total pixel levels added in the in-phase averager 109 and the average calculator 110) is a parameter that can be set by the user in the calculation of the correction gain Gn in the present embodiment. Accordingly, the digital signal can be corrected by using the correction gain Gn that is optimal for the characteristic of the instantaneous change in the imaging situation, for example, that is optimal for the time duration of the change.

Furthermore, the imaging frequency and the power frequency, which are constantly set in the image capturing, are included in the parameters used in the calculation of the correction gain Gn in the present embodiment. Accordingly, the present embodiment has an effect in that the plane flicker correction in which the imaging frequency and the flicker frequency are not limited can be easily performed on the digital signal.

Furthermore, the average Da is calculated from only the addition levels in phase with the flicker phase corresponding to the digital signal to be corrected and the correction gain Gn is calculated from the average Da and the average Dx in the present embodiment. Accordingly, the correction gain Gn used to correct the target digital signal can be made close to a more appropriate value. Consequently, the present embodiment has an effect in that the component of the plane flicker included in the digital signal can be more reliably removed.

Another Embodiment

[Configuration of Image Pickup Apparatus 501]

Figure 5:
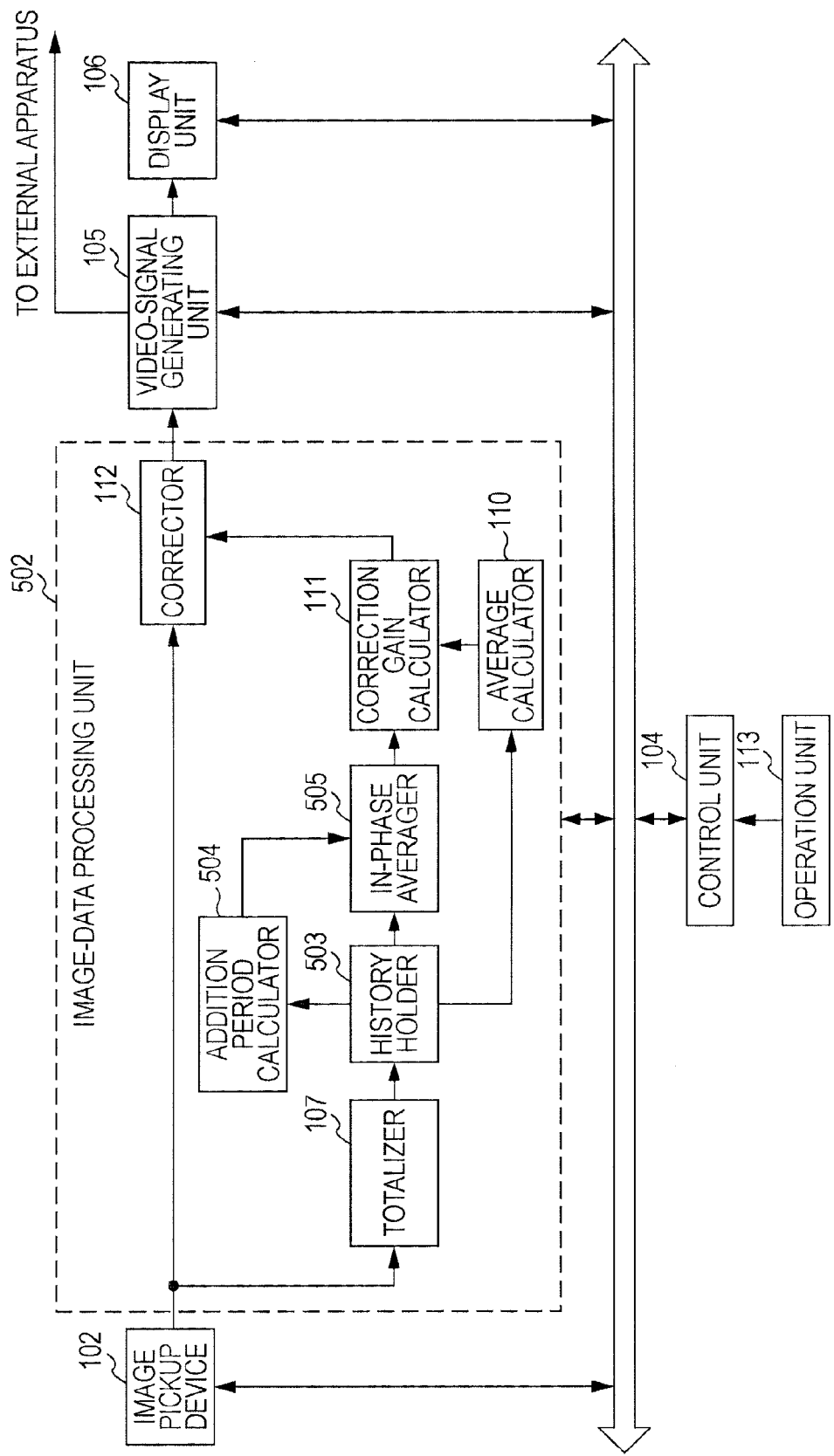
FIG. 5 is a functional block diagram showing an image pickup apparatus according to another embodiment of the present invention.

FIG. 5 is a functional block diagram showing an image pickup apparatus according to another embodiment of the present invention.

Referring to FIG. 5, an image pickup apparatus 501 determines an appropriate addition period (the number of the total pixel levels used in the calculation of the averages in the correction gain calculator and the average calculator) on the basis of a variation in the addition levels with time within a certain unit time to calculate the average Da during the addition period. Then, the image pickup apparatus 501 calculates the correction gain Gn on the basis of the calculated average Da and the average Dx to correct the digital signal by using the calculated correction gain Gn. The image pickup apparatus 501 includes an image-data processing unit 502, instead of the image-data processing unit 103 composing the image pickup apparatus 101 of the above embodiment.

The image-data processing unit 502 includes the totalizer 107, a history holder 503, an addition period calculator 504, an in-phase averager 505, the average calculator 110, the correction gain calculator 111, and the corrector 112. The same reference numerals are used in the image-data processing unit 502 to identify the components common to the image-data processing unit 103. A description of such components is omitted herein.

The history holder 503 is, for example, a frame memory, like the history holder 108 in the image-data processing unit 103. The history holder 503 holds the latest total pixel levels of a certain number among the total pixel levels supplied from the totalizer 107. Each time the data held in the history holder 503 is updated, all the total pixel levels held in the history holder 503 are supplied to the addition period calculator 504, the in-phase averager 505, and the average calculator 110.

According to the present embodiment, the number of the total pixel levels held in the history holder 503 is set to 900, which is the data corresponding to 900 frames. However, the number of the total pixel levels held in the history holder 503 and the number of the total pixel levels output from the history holder 503 are not limited to 900. The history holder 503 is electrically connected to the control unit 104, and the number of the total pixel levels held in the history holder 503 and the number of the total pixel levels output from the history holder 503 are set in accordance with a user's operation with the operation unit 113.

The addition period calculator 504 detects all the total pixel levels in phase with the flicker phase corresponding to the digital signal that is being supplied to the corrector 112 from the all the total pixel levels supplied from the history holder 503. The number of the detected total pixel levels corresponds to the certain unit time mentioned above. The detection is realized by using the imaging frequency and the blinking frequency of the illuminating light supplied from the control unit 104, as described above with reference to FIG. 2. The addition period calculator 504 determines the addition period on the basis of a variation in the detected total pixel levels with time and supplies the determined addition period to the in-phase averager 505. The total pixel levels supplied from the history holder 503 correspond to the respective flicker phases of the three patterns in this example. Accordingly, the number of the total pixel levels in phase with each other detected by the addition period calculator 504 is equal to one third of the number of the total pixel levels supplied from the history holder 503, that is, 300.

The in-phase averager 505 detects all the total pixel levels in phase with the flicker phase corresponding to the digital signal that is being supplied to the corrector 112 from the all the total pixel levels supplied from the history holder 503. The detection is performed in the in-phase averager 505 in the same manner as in the addition period calculator 504. The in-phase averager 505 selects the total pixel levels corresponding to the addition period determined by the addition period calculator 504 from all the detected total pixel levels to calculate the average Da of the selected addition levels and supplies the average Da to the correction gain calculator 111.

[Operation of Image Pickup Apparatus 501]

An example of the operation of the image pickup apparatus 501 will now be described with reference to FIGS. 6 and 7.

Figure 6:
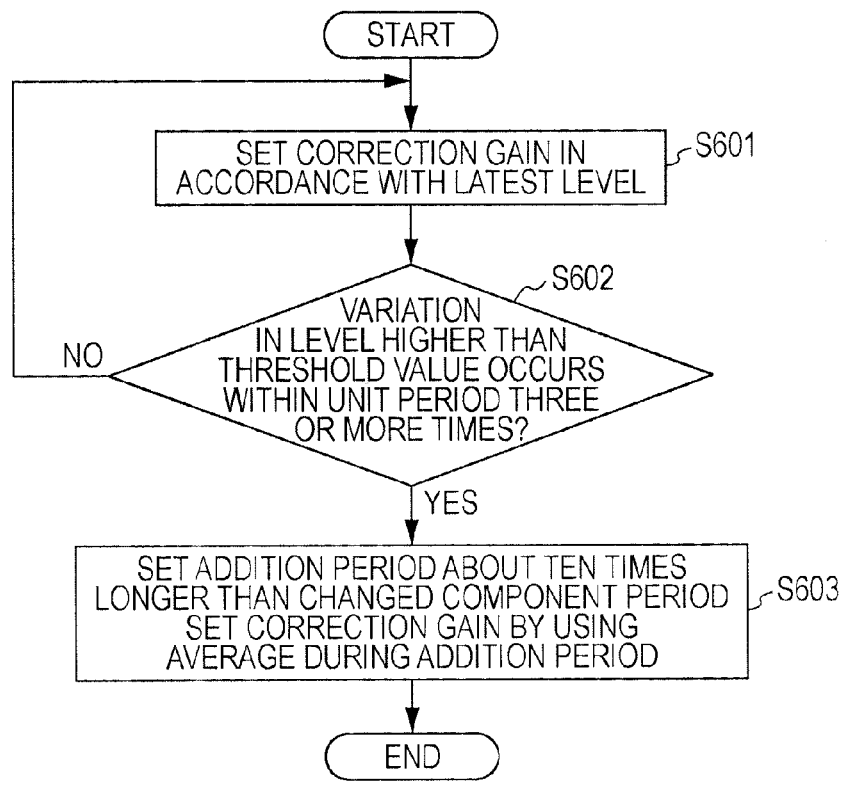
FIG. 6 is a flowchart showing part of the flicker correction process by another image-data processing unit.

FIG. 6 is a flowchart showing part of a flicker correction process by the image-data processing unit 502.

Referring to FIG. 6, when the image capturing by the image pickup apparatus 501 is started, in Step S601, the correction gain Gn corresponding to the latest total pixel level that has been calculated in the totalizer 107 is set. The corrector 112 uses the correction gain Gn set in Step S601 to correct the digital signal supplied from the image pickup device 102 to the corrector 112.

Concurrently, the digital signal is being supplied from the image pickup device 102 to the totalizer 107 where the total pixel level in each frame is sequentially calculated from the received digital signal. Each time the total pixel level is calculated, the calculated total pixel level is supplied to the history holder 503.

The history holder 503 holds the latest 900 total pixel levels among the total pixel levels supplied from the totalizer 107. Each time the 900 total pixel levels held in the history holder 503 are updated, the 900 total pixel levels held in the history holder 503 are supplied to the addition period calculator 504, the in-phase averager 505, and the average calculator 110.

The addition period calculator 504 detects the 300 total pixel levels (corresponding to the unit time) in phase with the flicker phase corresponding to the digital signal that is being supplied to the corrector 112 in time series from the latest 900 total pixel levels supplied from the history holder 503.

Figure 7:
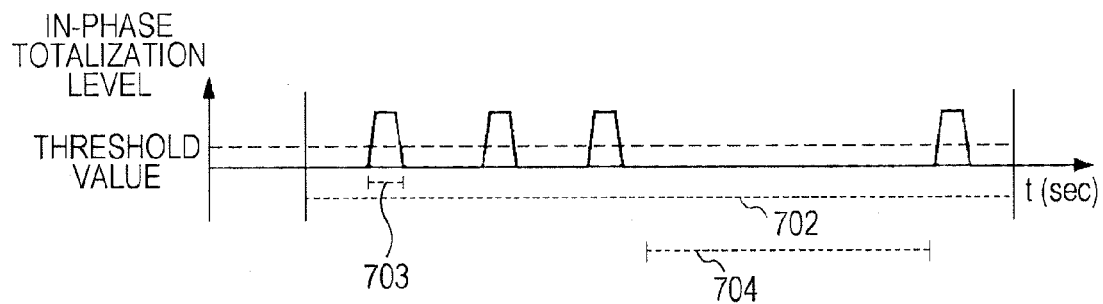
FIG. 7 is a waveform diagram in which 300 total pixel levels detected by an addition period calculator are arranged in time series.

FIG. 7 is a waveform diagram in which the 300 total pixel levels detected by the addition period calculator 504 are arranged in time series.

In Step S602 in FIG. 6, it is confirmed whether three or more changes which have the same changed component period 703 and the total pixel level of which exceed a predetermined threshold value occur during a unit period 702. If it is not confirmed that three or more changes described above occur during the unit period 702 (NO in Step S602), the process goes back to Step S601.

If it is confirmed that three or more changes described above occur during the unit period 702 (YES in Step S602), the addition period calculator 504 calculates a period about ten times longer than the confirmed changed component period 703 as an addition period 704 in FIG. 7 and supplies the calculated addition period 704 to the in-phase averager 505. For example, when the number of the total pixel levels corresponding to the changed component period 703 in FIG.

7 is three, the 30 addition periods are supplied from the addition period calculator 504 to the in-phase averager 505.

Then, the in-phase averager 505 detects the 300 total pixel levels in phase with the flicker phase corresponding to the digital signal that is being supplied to the corrector 112 from the latest 900 total pixel levels supplied from the history holder 503. The in-phase averager 505 calculates the average Da of the latest 30 total pixel levels (corresponding to the addition period 704) from the detected 300 total pixel levels in phase with each other. The in-phase averager 505 supplies the calculated average Da to the correction gain calculator 111.

The same total pixel levels as the latest 900 total pixel levels supplied from the history holder 503 to the in-phase averager 505 are supplied to the average calculator 110. The average calculator 110 calculates the average Dx of the latest 900 total pixel levels and supplies the calculated average Dx to the correction gain calculator 111.

After the above steps are completed, in Step S603, the correction gain calculator 111 applies Equation (1) to the average Da supplied from the in-phase averager 505 and the average Dx supplied from the average calculator 110 to calculate the correction gain Gn used to correct the digital signal that is being supplied to the corrector 112. The correction gain calculator 111 supplies the calculated correction gain Gn to the corrector 112. The corrector 112 multiplies the digital signal supplied from the image pickup device 102 by the correction gain Gn supplied from the correction gain calculator 111 for every frame to remove the component of the plane flicker included in the digital signal.

Since any instantaneous change that occurs in the imaging situation can be prevented from affecting the correction gain Gn that is calculated in the present embodiment, as in the embodiment described above, the appropriate correction gain Gn can be applied to the digital signal to be corrected in order to perform the correction. Consequently, it is possible to suppress a reduction in the quality of the moving image due to incorrect determination of the flicker.

In addition, in the present embodiment, the variation with time of the total pixel levels in phase with each other within the unit time is monitored, the addition period is calculated in accordance with the variation, and the correction gain is calculated on the basis of the calculated addition period. Accordingly, the correction gain corresponding to the imaging situation can be calculated. Since the digital signal is corrected by using the correction gain corresponding to the imaging situation, it is possible to more reliably remove the plane flicker from the digital signal.

<Modifications>

The total pixel level in each frame is calculated and the correction gain is calculated for every frame on the basis of the total pixel level in the embodiments described above. However, the total pixel level in each area resulting from division of each frame may be calculated and the correction gain may be calculated for every area on the basis of the total pixel level in each area.

The removal of the plane flicker appearing in a moving image captured by the CCD image pickup device, which is an example of the image pickup device having the global shutter function, is exemplified in the above embodiments. However, flicker other than the plane flicker, appearing in a moving image captured by the image pickup device having the rolling shutter function, for example, a complementary metal oxide semiconductor (CMOS) image pickup device may be removed. In this case, the flicker component included in the digital signal generated by the CMOS image pickup device can be removed by performing the flicker correction process on the digital signal on each line of the CMOS image pickup device.

Although the addition period that is about ten times longer than the changed component period is used in the above embodiments, the addition period is not limited to the above one.

The present application contains subject matter related to that disclosed in Japanese Priority Patent Application JP 2009-098234 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image-data processing apparatus comprising:
   an operation unit;
   a correcting unit configured to multiply image data generated by an image pickup device that performs image capturing at a certain imaging frequency by a correction gain that is set;
   a totalizing unit configured to sequentially calculate a total pixel level for every frame from the image data generated by the image pickup device, the total pixel level corresponding to the sum of the pixel levels of the pixels within a certain range in each frame;
   a history holding unit configured to hold the total pixel levels of a certain number each time the total pixel levels are calculated;
   an in-phase averaging unit configured to detect the total pixel levels in phase with a flicker phase corresponding to the image data that is being supplied to the correcting unit from the total pixel levels held in the history holding unit on the basis of the imaging frequency and a power frequency supplied from the operation unit to calculate a first average, which is the average of the detected total pixel levels;
   an average calculating unit configured to calculate a second average, which is the average of the total pixel levels held in the history holding unit; and
   a correction gain calculating unit configured to calculate the correction gain by dividing the first average calculated in the in-phase averaging unit by the second average calculated in the average calculating unit to set the calculated correction gain in the correcting unit.

2. The image-data processing apparatus according to claim 1, further comprising:
   a control unit configured to vary the number of the total pixel levels held in the history holding unit in accordance with an operation of a user with the operation unit.

3. The image-data processing apparatus according to claim 1, further comprising:
   an addition period calculating unit configured to detect the total pixel levels in phase with the flicker phase corresponding to the image data that is being supplied to the correcting unit from the total pixel levels held in the history holding unit on the basis of the imaging frequency and the power frequency, monitor a variation in time series of the detected total pixel levels, and calculate an addition period on the basis of the monitored variation in time series of the total pixel levels,
   wherein the in-phase averaging unit calculates the average of the total pixel levels of a number corresponding to the addition period calculated in the addition period calculating unit, among the detected total pixel levels.

4. The image-data processing apparatus according to claim 1,
wherein the image pickup device includes an image pickup device having a global shutter function.

5. The image-data processing apparatus according to claim 1,
wherein the image pickup device includes an image pickup device having a rolling shutter function.

6. An image pickup apparatus comprising:
an operation unit;
an image pickup device configured to perform photoelectric conversion on incident light to generate image data;
a correcting unit configured to multiply the image data generated by the image pickup device that performs image capturing at a certain imaging frequency by a correction gain that is set;
a totalizing unit configured to sequentially calculate a total pixel level for every frame from the image data generated by the image pickup device, the total pixel level corresponding to the sum of the pixel levels of the pixels within a certain range in each frame;
a history holding unit configured to hold the total pixel levels of a certain number each time the total pixel levels are calculated;
an in-phase averaging unit configured to detect the total pixel levels in phase with a flicker phase corresponding to the image data that is being supplied to the correcting unit from the total pixel levels held in the history holding unit on the basis of the imaging frequency and a power frequency supplied from the operation unit to calculate a first average, which is the average of the detected total pixel levels;
an average calculating unit configured to calculate a second average, which is the average of the total pixel levels held in the history holding unit; and
a correction gain calculating unit configured to calculate the correction gain by dividing the first average calculated in the in-phase averaging unit by the second average calculated in the average calculating unit to set the calculated correction gain in the correcting unit.

* * * * *